United States Patent [19]
Kito

[11] Patent Number: 5,444,698
[45] Date of Patent: Aug. 22, 1995

[54] MOBILE RADIO COMMUNICATION SYSTEM CAPABLE OF PREVENTING INTERFERENCE BETWEEN TIME SLOTS WHEN PROPAGATION DELAY EXISTS

[75] Inventor: Eiji Kito, Tokyo, Japan

[73] Assignee: NEC Corporation, Tokyo, Japan

[21] Appl. No.: 277,014

[22] Filed: Jul. 19, 1994

[30] Foreign Application Priority Data

Jul. 21, 1993 [JP] Japan .................................. 5-180418

[51] Int. Cl.$^6$ .............................................. H04B 1/54
[52] U.S. Cl. ..................................... 370/29; 455/54.1; 370/6; 370/95.1
[58] Field of Search ..................... 455/50.1, 51.1, 54.1, 455/56.1, 67.6, 295; 370/6, 24, 29, 32, 85.7, 95.1, 95.3

[56] References Cited

U.S. PATENT DOCUMENTS

| | | | |
|---|---|---|---|
| 4,845,735 | 7/1989 | Payne et al. | 379/5 |
| 5,124,985 | 6/1992 | Hoshikawa et al. | 370/29 |
| 5,134,710 | 7/1992 | Akerberg | 455/54.1 |
| 5,260,944 | 11/1993 | Tomabechi | 370/29 |
| 5,278,835 | 1/1994 | Ito et al. | 455/54.1 |

FOREIGN PATENT DOCUMENTS 2241411 8/1991 United Kingdom .

*Primary Examiner*—Benedict V. Safourek
*Attorney, Agent, or Firm*—Young & Thompson

[57] ABSTRACT

A mobile radio communication system has a base station, first through N-th mobile stations communicating with the base station through a radio channel carrying a communication signal, where N represents a positive integer which is greater than one, and a main station connected to the base station through a communication path having a path propagation delay time. The main station communicates with the first through the N-th movable stations by the communication signal. The communication signal has a first frame and a second frame following the first frame. The second frame may be followed by the first frame with a predetermined period interposed between the second frame and the first frame. The first frame has first primary through N-th primary time slots which are arranged in sequential order. The second frame has first subsidiary through N-th subsidiary time slots which are arranged in sequential order. The main station has a detecting circuit for detecting whether or not the path propagation delay time is longer than a predetermined delay time. When the path propagation delay time is longer than the predetermined delay time, the detecting circuit produces a detection signal. Responsive to the detection signal, an inhibiting circuit inhibits the first through the N-th mobile stations from using either one of the first primary and the N-th subsidiary time slots in the communication signal.

5 Claims, 4 Drawing Sheets

MOBILE RADIO COMMUNICATION SYSTEM CAPABLE OF PREVENTING INTERFERENCE BETWEEN TIME SLOTS WHEN PROPAGATION DELAY EXISTS

BACKGROUND OF THE INVENTION

1. Field of the Invention

This invention relates to a mobile radio communication system which uses a time division multiplex.

2. Description of the Related Art

In general, a mobile radio communication system comprises a base station and first through N-th mobile stations, where N represents a positive integer which is greater than one. Each of the mobile stations may be carried by an automobile or a human being and has a variable location. The base station has a communication area in which the first through the N-th mobile stations are capable of communicating with the base station through a radio channel carrying a communication signal which may be called a time division duplex (TDD) signal.

The TDD signal has a first frame and a second frame following the first frame. The second frame may be further followed by another first frame. The first frame has first primary through N-th primary time slots which are arranged in sequential order. Similarly, the second frame period has first subsidiary through N-th subsidiary time slots.

More particularly, the first primary through the N-th primary time slots are assigned as reception time slots to the first through the N-th movable stations, respectively. The first subsidiary through the N-th subsidiary time slots are assigned as transmission time slots to the first through the N-th movable stations, respectively.

The radio channel has a channel propagation delay time which is defined by the communication area. By the channel propagation delay time, a partial overlap often occurs between the first frame and the second frame. In order to prevent the partial overlap, the second frame is followed by another first frame with a predetermined period interposed between the second frame and the first frame. The predetermined period may be determined on the basis of the channel propagation delay time.

A conventional mobile communication system may further comprise a main station connected to the base station through a communication path having a path propagation delay time. In this case, the main station communicates with the first through the N-th mobile stations by the TDD signal. The communication path may be, for example, a cable.

When the path propagation delay time is longer than a predetermined propagation delay time, interference occurs between the first frame and the second frame.

SUMMARY OF THE INVENTION

It is therefore an object of this invention to provide a mobile radio communication system capable of preventing interference between the first frame and the second frame.

Other objects of this invention will become clear as the description proceeds.

On describing the gist of this invention, it is necessary to understand that a mobile radio communication system comprises a base station, first through N-th mobile stations being capable of communicating with the base stations through a radio channel carrying a communication signal, where N represents a positive integer is greater than one, and a main station connected to the base station through a communication path having a path propagation delay time. The main station communicates with the first through the N-th mobile stations by the communication signal. The communication signal has a first frame and a second frame following the first frame. The second frame is further followed by another first frame with a predetermined period interposed between the second frame and the first frame. The first frame has first primary through N-th primary time slots which are arranged in a sequential order. The second frame has first subsidiary through N-th subsidiary time slots which are arranged in a sequential order.

According to this invention, the above-understood main station comprises detecting means for detecting whether or not the path propagation delay time is longer than a predetermined delay time to produce a detection signal when the path propagation delay time is longer than the predetermined delay time and inhibiting means for inhibiting the first through the N-th mobile stations from using either one of the first primary and the N-th subsidiary time slots in the communication signal in response to the detection signal.

DESCRIPTION OF THE PREFERRED EMBODIMENT

Figure 1:
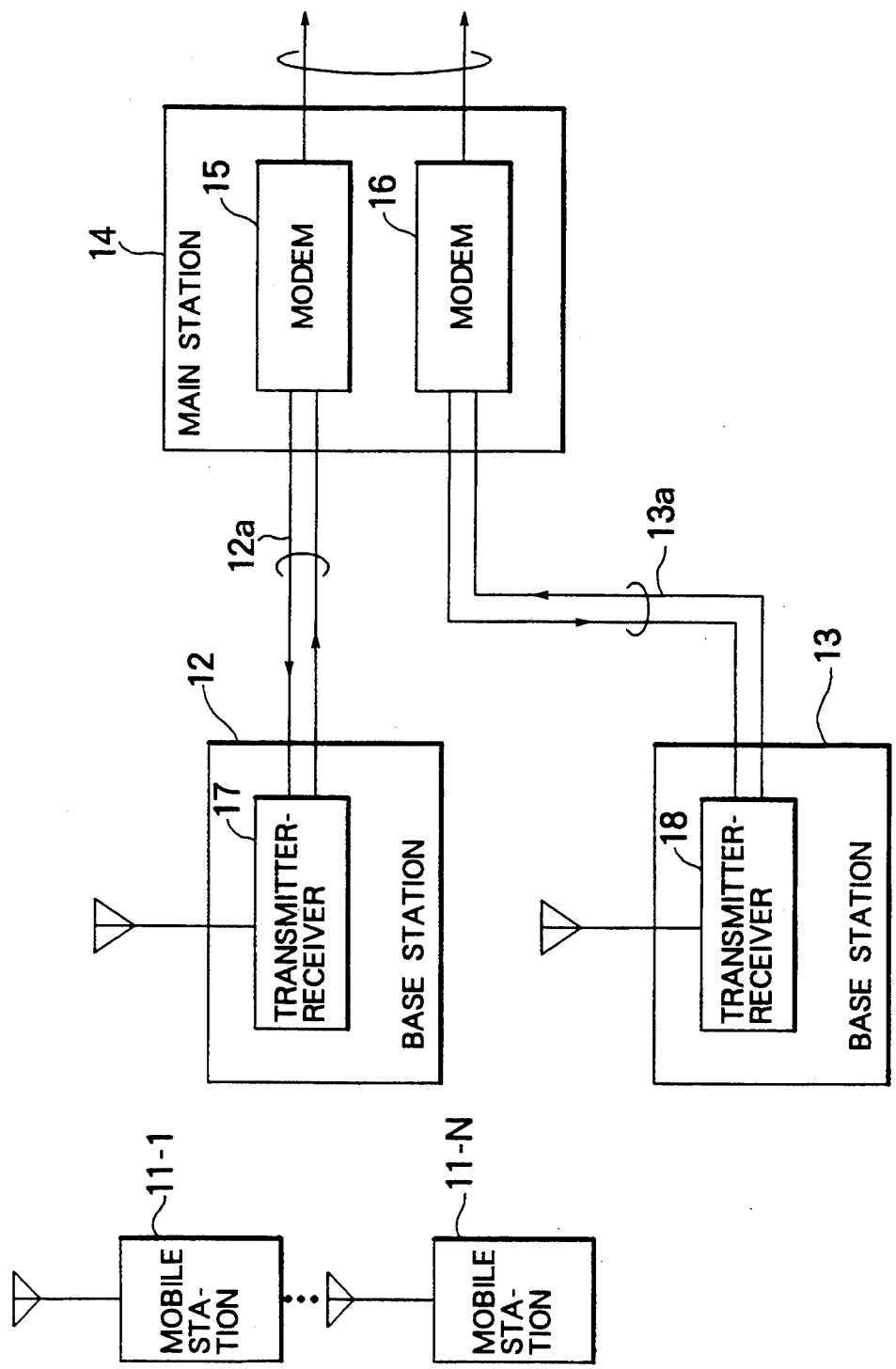
FIG. 1 is a block diagram of a conventional mobile radio communication system.

Referring to FIG. 1, a conventional mobile radio communication system will be described at first in order to facilitate an understanding of this invention. The mobile radio communication system comprises first through N-th mobile stations 11-1 to 11-N and a base station 12, where N represents a positive integer greater than one. Each of the first through the N-th mobile stations 11-1 to 11-N may be carried by an automobile or a human being and has a variable location. The base station 12 has a communication area in which the first through the N-th mobile stations 11-1 to 11-N are capable of communicating with the base station 12 through a radio channel carrying a communication signal which may be called a time division duplex (TDD) signal.

Figure 2:
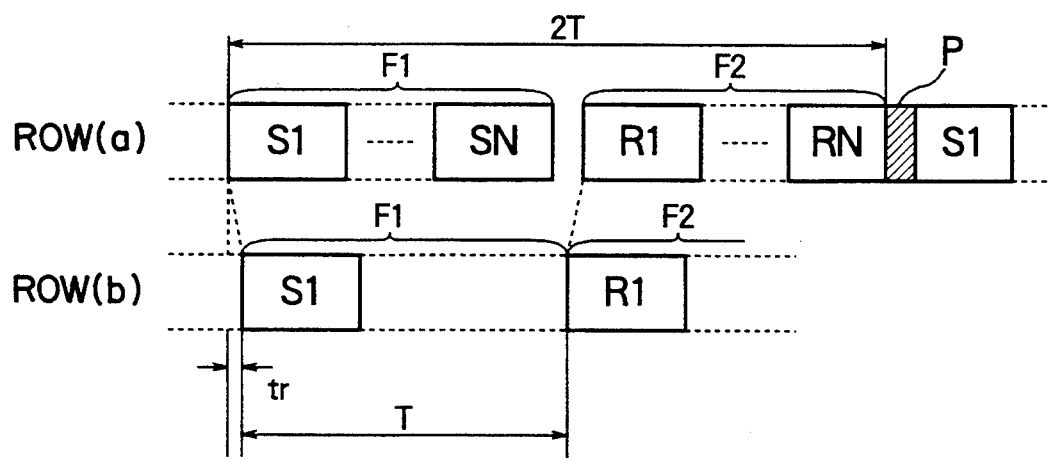
FIG. 2 is a timing chart for describing operation of the mobile radio communication system illustrated in FIG. 1.

Referring to FIG. 2, the TDD signal has a first frame F1 and a second frame F2 following the first frame F1 as shown in a top or first row labelled (a) in FIG. 2. The second frame F2 is followed by the first frame F1 with a predetermined period P interposed between the second frame F2 and the first frame F1 as shown in row (a) in FIG. 2. The predetermined period P may be called a guard time duration. Each of the first and the second frames F1 and F2 has a frame period which is given by T. Namely, the TDD signal is composed of a transmission signal and a reception signal which have the first frame F1 and the second frame F2, respectively. The first frame F1 has first primary through N-th primary time slots S1 to SN which are arranged in a sequential order. Similarly, the second frame F2 has first subsidiary through N-th subsidiary time slots R1 to RN.

Referring to FIG. 1 in addition to FIG. 2, each of the first through the N-th mobile stations 11-1 to 11-N uses either one of the first primary through the N-th primary time slots S1 to SN on a reception operation. Similarly, each of the first through the N-th mobile stations uses either one of the first subsidiary through the N-th subsidiary time slots R1 to RN on a transmission operation.

Reviewing FIG. 1, the mobile radio communication system may further comprise an additional base station 13 having an additional communication area different from the communication area of the base station 12. When the first through the N-th mobile stations 11-1 to 11-N are located in the additional communication area, the first through the N-th mobile stations 11-1 to 11-N are capable of communicating with the additional base station 13 through the radio channel carrying the TDD signal.

The base station 12 is connected to a main station 14 through a communication path 12a which may be, for example, a cable. As a result, the main station 14 communicates with the first through the N-th mobile stations 11-1 to 11-N through the base station 12 when the first through the N-th mobile stations 11-1 to 11-N are located in the communication area. The additional base station 13 is also connected to the main station 14 through an additional communication path 13a which also maybe a cable. When the first through the N-th mobile stations 11-1 to 11-N are located in the additional communication area, the main station 14 communicates with the first through the N-th mobile stations 11-1 to 11-N through the additional base station 13. The main station 14 may be remote from each of the base station 12 and the additional base station 13. The main station 14 may be connected to a toll center (not shown). The main station 14 comprises a modulator and demodulator (MODEM) 15 and an additional MODEM 16 which is similar in structure to the MODEM 15. In addition, the base station 12 and the additional base station 13 each comprises a transmitter-receiver 17 and an additional transmitter-receiver 18, respectively.

It will be assumed that the first mobile station 11-1 is located in the communication area and that the first mobile station 11-1 communicates with the main station 14 by using the first primary time slot and the first subsidiary time slot. On communicating with the first mobile station 11-1, the main station 14 may receive an input signal from the toll center. The input signal has the first frame F1 which is described above. In the main station 14, the MODEM 15 modulates the input signal into a main modulated signal to transmit the main modulated signal to the communication path 12a. Supplied with the main modulated signal, the transmitter-receiver transmits the main modulated signal as a base transmission signal to the first mobile station 11-1 through the radio channel.

Referring to FIG. 1 in addition to FIG. 2, the base transmission signal has the first frame F1 which has first primary through the N-th primary time slots S1 to SN as shown in the first row (a) in FIG. 2. The transmission signal is received as a first mobile reception signal at the first mobile station 11-1 after a radio propagation delay time tr as shown in a second row labelled (b) in FIG. 2. After the frame period T lapses, the first mobile station 11-1 transmits a first mobile transmission signal to the base station 12 through the radio channel. Namely, the first mobile station 11-1 transmits the first mobile transmission signal by using the first subsidiary time slot R1 of the reception signal in the TDD signal as shown in the second row (b) in FIG. 2. The first mobile transmission signal is received as a base reception signal at the base station 12 after the radio propagation delay time tr.

It will be assumed that the base station 12 again transmits the base transmission signal to the first mobile station 11-1 as soon as a signal period 2T of the TDD signal lapses. In this case, a partial overlap occurs between the base transmission signal and the base reception signal in the base station 12 by the radio propagation delay time tr. In order to prevent such a partial overlap, the above-mentioned predetermined period P is interposed between the second frame F2 and the first frame F1. The predetermined period P is generally determined in accordance with the radio propagation delay time.

Again referring to FIG. 1, the base station 12 is connected to the main station 14 through the communication path 12a as described above. The communication path 12a generally has a path propagation delay time. Inasmuch as the path propagation delay time is not considered in the above-mentioned mobile radio communication system, the partial overlap or interference inevitably occurs when the path propagation delay time is longer than a predetermined delay time.

In a similar manner described above, the second through the N-th mobile stations 11-2 to 11-N communicates with the main station 14 through the base station 12 when the second through the N-th mobile stations 11-2 to 11-N are located in the communication area. In this case, the first through the N-th mobile stations 11-1 to 11-N communicates with the main station 14 by using time slots different from one another. Similarly, the first through the N-th mobile stations 11-1 to 11-N communicates with the main station 14 through the additional base station 13 when the first through the N-th mobile stations 11-1 to 11-N are located in the additional communication area.

Figure 3:
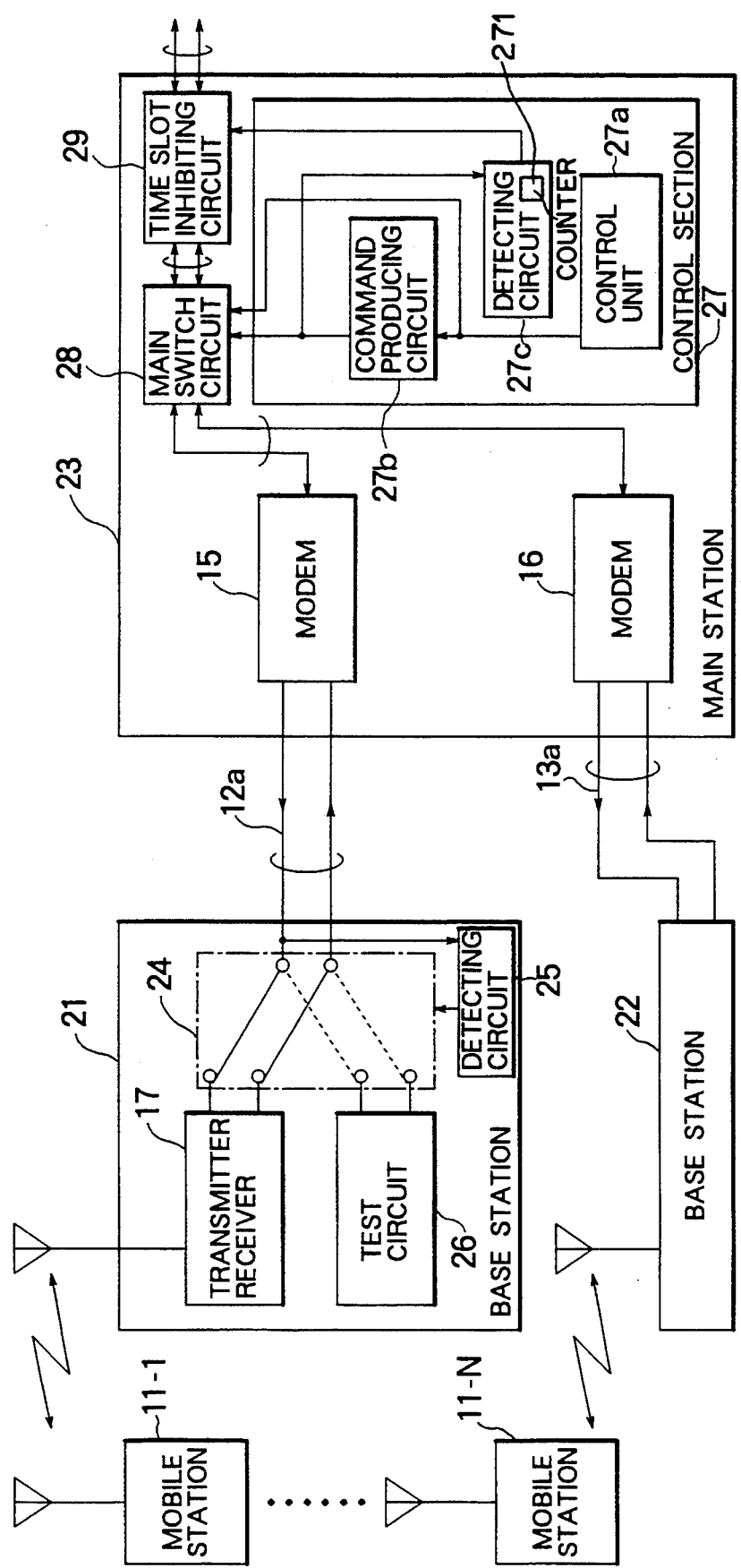
FIG. 3 is a block diagram of a mobile radio communication system according to a preferred embodiment of this invention.

Referring to FIG. 3, description will proceed to a mobile radio communication system according to a preferred embodiment of this invention. The illustrated mobile radio communication system comprises a base station and an additional base station which are different in structure from the base station 12 and the additional base station 13 illustrated in FIG. 1 and which are therefore designated afresh by reference numerals 21 and 22, respectively. The mobile radio communication system further comprises a main station which is different in structure from the main station 14 illustrated in FIG. 1 and which is therefore designated by a reference numeral 23. The mobile radio communication system comprises similar parts which are designated by like reference numerals and operable with likewise named signals.

The base station 21 comprises a base switch circuit 24, a base detecting circuit 25, and a test circuit 26 in addition to the transmitter-receiver 17. The additional base station 22 is similar in structure to the base station 21 although the structure of the additional base station 22 is not illustrated in FIG. 3. The main station 23 comprises a control section 27 in addition to the MODEM 15 and the additional MODEM 16. The main station further comprises a main switch circuit 28 and a time slot inhibiting circuit 29.

As described in conjunction with FIG. 1, the base station 21 is connected to the main station 23 through the communication path 12a having the path propagation delay time. Similarly, the additional base station 22 is connected to the main station 23 through the additional communication path 13a having the additional path propagation delay time.

Figure 4:
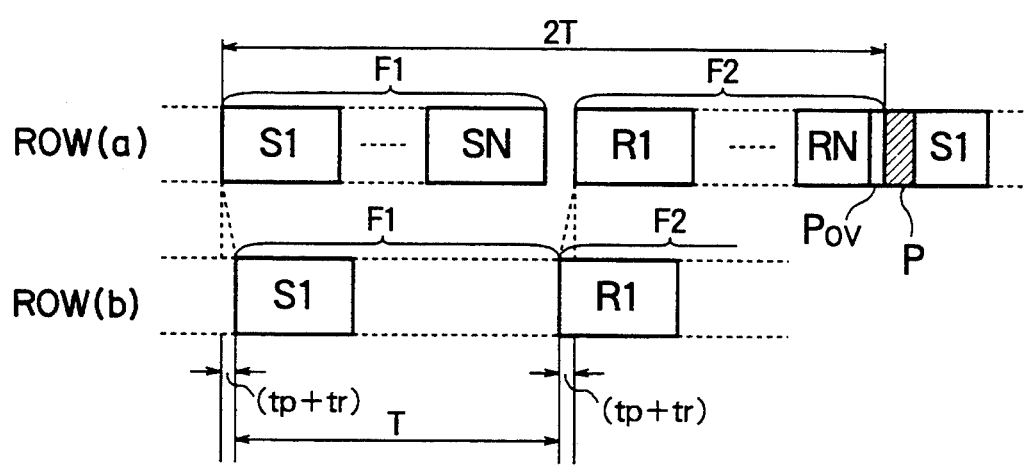
FIG. 4 is a timing chart for describing operation of the mobile radio communication system illustrated in FIG. 3.

Referring-to FIG. 3 in addition to FIG. 4, it will be assumed that the first mobile station 11-1 is located in the communication area of the base station 21 and that the first mobile station 11-1 communicates with the main station 23 by using the first primary time slot S1 and the first subsidiary time slot R1. The base switching circuit 24 normally connects the transmitter-receiver 17 to the communication path. On communicating with the first mobile station 11-1, the main station 23 receives the input signal from the toll center (not shown). The input signal has The first frame F1 which is described above. In the main station 23, both of the time slot inhibiting circuit 29 and the main switching circuit 28 allow the input signal to pass therethrough. As a result, the input signal is supplied to the MODEM 15 to be modulated into the main modulated signal. The main modulated signal is transmitted as the main transmission signal to the base station 21 through the communication path 12a. The base station 21 receives the main transmission signal after the path propagation delay time which is given by tp. In the base station 21, the main transmission signal is supplied to the transmitter-receiver 17 through the base switching circuit 24. The transmitter-receiver 17 transmits the main transmission signal as the base transmission signal to the first mobile stations 11-1 through the radio channel.

As described in conjunction with FIG. 2, the base transmission signal has the first frame F1 which has first primary through the N-th primary time slots S1 to SN as shown in a first row labelled (a) in FIG. 4. The base transmission signal is received as the first mobile reception signal after radio propagation delay time tr. Namely, when the main station 23 transmits the main transmission signal on the communication path 12a, the first mobile station 11-1 receives the first mobile reception signal after a total propagation delay time which is given by (tp+tr), as shown in a second row labelled (b) in FIG. 4.

After the frame period T lapses, the first mobile station 11-1 transmits the first mobile transmission signal to the base station 21 through the radio channel. Namely, the first mobile station 11-1 transmits the first mobile transmission signal by using the first subsidiary time slot R1 of the reception signal in the TDD signal as shown in the second row (b) in FIG. 4. The first mobile transmission signal is received as the base reception signal at the transmitter-receiver 17 of the base station 21 after the radio propagation delay time tr. The transmitter-receiver 17 supplies the base reception signal to the main station 23 through the communication path 12a.

In the main station 23, the MODEM 15 receives the base reception signal as the main reception signal after the path propagation delay time tp to demodulate the main reception signal into a demodulated signal. The demodulated signal is supplied to the toll center through the main switching circuit 28 and the time slot inhibiting circuit 29.

As described in conjunction with FIGS. 1 and 2, the predetermined period P is determined on the basis of the communication area of the base station. When the main station 23 again transmits the modulated signal to the base station 21 in order to communicate with the first mobile station 11-1 after the predetermined period P lapses, the partial overlap or the interference $P_{OV}$ occurs between the main transmission signal and the main reception signal as shown in the first row (a) in FIG. 4 in case where the path propagation delay time tp is longer than the predetermined propagation delay time. As a result, the first mobile station 11-1 can not communicate with the main station 23 inasmuch as the first primary time slot S1 partially overlaps on the N-th subsidiary time slot RN.

Again referring to FIG. 3, the main station 23 measures the path propagation delay time tp in order to prevent the above-mentioned partial overlap. The control section 27 comprises a control unit 27a for supplying a test start signal to the main switching circuit 28 and a command producing circuit 27b.

Supplied with the test start signal, the main switching circuit 28 connects the command producing circuit 27b to the MODEM 15. Responsive to the test start signal, the command producing circuit 27b produces a test command signal having a test command and a test information signal following the test command. The test command signal is supplied to the MODEM 15 through the main switching circuit 28. The test command signal is further supplied to a main detecting circuit 27c. The main detecting circuit 27c has a counter 271 which starts counting at a first time instant in response to the test command signal. The counter 271 is well known in the art.

The MODEM 15 modulates the test command signal into a modulated test command signal. The modulated test command signal carries the test command and the test information signal. The modulated test command signal is supplied to the base station 21 through the communication path 12a by using a predetermined time slot, for example, the first primary time slot S1. In the base station 21, the base detecting circuit 25 produces a switching signal when the base detecting circuit 25 detects the test command in the modulated test command signal. Responsive to the switching signal, the base switching circuit 24 connects the test circuit 26 to the communication path 12a. As a result, the test information signal carried by the modulated test command signal is supplied to the test circuit 26.

The test circuit 26 produces an answer signal on the basis of the test information signal. The answer signal is supplied to the main station 23 through the base switching circuit 24 and the communication path 12a by using a prescribed time slot, for example, the first subsidiary time slot R1. In the main station 23, the MODEM 15 demodulates the answer signal into a demodulated answer signal. The demodulated answer signal is supplied to the main detecting circuit 27c through the main switching circuit 28.

In the main detecting circuit 27c, the counter 271 stops counting at a second time instant in response to the demodulated answer signal. By the first and the second time instants, the main detecting circuit 27c knows a time duration which is representative of approximately twice the path propagation delay time tp. The main detecting circuit 27c divides the time duration by two to obtain a detected path propagation delay time. The main detecting circuit 27c detects whether or not the detected path propagation delay time is longer than the predetermined delay time. When the detected propagation delay time is longer than the predetermined delay time, the main detecting circuit 23b produces a detection signal to supply the detection signal to the time slot inhibiting circuit 29.

Supplied with the detection signal, the time slot inhibiting circuit 29 inhibits using a specific one of the first primary through the N-th primary time slots and the first subsidiary through the N-th subsidiary time slots. As a result, the first through the N-th mobile stations 11-1 to 11-N can not use the specific time slot. More particularly, the time slot inhibiting circuit 29 inhibits using either one of the first primary and the N-th subsidiary time slots in response to the detection signal. Namely, the time slot inhibiting circuit 29 inhibits the first through the N-th mobile stations 11-1 to 11-N from using either one of the first primary and the N-th subsidiary time slots in the TDD signal in response to the detection signal.

In a similar manner described above, the additional path propagation delay time is measured by the main station 14. In this case, the main detecting circuit 27c detects whether or not the additional path propagation delay time is longer than the predetermined delay time. When the additional path propagation delay time is longer than the predetermined delay time, the main detecting circuit 27c produces an additional detection signal. Responsive to the additional detection signal, the time slot inhibiting circuit inhibits the first through the N-th mobile station from using either one of the first primary and the N-th subsidiary time slots in the TDD signal.

Modifications of the invention herein disclosed will occur to a person skilled in the art and all such modifications are deemed to be within the scope of this invention as defined by the appended claims.

What is claimed is:

1. A mobile radio communication system comprising a base station having a communication area, first through N-th mobile stations being capable of communicating with said base station through a radio channel carrying a communication signal when said first through N-th mobile stations are located in said communication area, where N represents a positive integer which is greater than one, and a main station connected to said base station through a communication path having a path propagation delay time, said main station communicating with said first through said N-th mobile stations by said communication signal through said base station, wherein:

said communication signal comprises a plurality of transmission frames and a plurality of reception frames, one of said transmission frames being followed by one of said reception frames that is, in turn, followed by an additional one of said transmission frames with a predetermined period interposed between the one of said reception frames and the additional one of said transmission frame, each of said transmission frames having first primary through N-th primary time slots which are arranged in a sequential order, each of said reception frames having first subsidiary through N-th subsidiary time slots which are arranged in a sequential order;

said main station comprising:

detecting means for detecting whether said path propagation delay time is longer than a predetermined delay time to produce a detection signal when said path propagation delay time is longer than said predetermined delay time; and inhibiting means for inhibiting said first through said N-th mobile stations from using either one of said first primary and said N-th subsidiary time slots in said communication signal in response to said detection signal.

2. A mobile radio communication system as claimed in claim 1, wherein:

said detecting means measures a propagation delay time between said main station and said base station to obtain said path propagation delay time.

3. A mobile radio communication system as claimed in claim 2, wherein said main station further comprises:

test command producing means for producing a test command signal to supply said test command signal to said base station through said communication path;

said base station comprising:

answer producing means for producing an answer signal signal in response to said test command signal to supply said answer signal to said main station through said communication path;

said detecting means starting a count in response to said test command signal at a first time instant, said detecting means stopping said count in response to said answer signal at a second time instant, said detecting means measuring said time duration in accordance with said first and said second time instant to obtain said path propagation delay time.

4. A mobile radio communication system as claimed in claim 3, said base station comprising transmitter-receiver means for communicating with said first through said N-th mobile stations and said main station, wherein said base station further comprises:

connecting means for selectively connecting said transmitter-receiver means and said answer means to said communication path, said connecting means responsive to said test command signal for connecting said answer means to said communication path to supply said test command signal to said answer means.

5. A mobile radio communication system as claimed in claim 1, further comprising an additional base station having an additional communication area, said additional base station communicating with said first through N-th mobile stations through said radio channel carrying said communication signal when said first through said N-th mobile stations are located in said additional communication area, said additional base station being connected to said main station through an additional communication path having an additional path propagation delay time, wherein:

said detecting means further detects whether said additional path propagation delay time is longer than said predetermined delay time to produce an additional detection signal when said additional path propagation delay time is longer than said predetermined delay time; and said inhibiting means further inhibiting said first through said N-th mobile stations from using either one of said first primary and said N-th subsidiary time slots in said communication signal in response to said additional detection signal.

* * * * *